United States Patent [19]

Datta

[11] Patent Number: 6,081,890

[45] Date of Patent: Jun. 27, 2000

[54] METHOD OF COMMUNICATION BETWEEN FIRMWARE WRITTEN FOR DIFFERENT INSTRUCTION SET ARCHITECTURES

[75] Inventor: Sham Datta, Hillsboro, Oreg.

[73] Assignee: Intel Corporation, Santa Clara, Calif.

[21] Appl. No.: 09/201,350

[22] Filed: Nov. 30, 1998

[51] Int. Cl.[7] .............................. G06F 9/445; G06F 9/455
[52] U.S. Cl. ................................. 713/1; 713/2; 395/500.48
[58] Field of Search ..................... 395/500.44, 500.47, 395/500.48; 713/1, 2, 100; 703/27

[56] References Cited

U.S. PATENT DOCUMENTS

| | | |
|---|---|---|
| 3,891,974 | 6/1975 | Coulter et al. .......................... 395/500 |
| 4,077,058 | 2/1978 | Appell et al. ........................... 395/712 |
| 5,388,215 | 2/1995 | Baker et al. ......................... 395/500.44 |

Primary Examiner—Dennis M. Butler
Attorney, Agent, or Firm—Leo V. Novakoski

[57] ABSTRACT

A firmware system comprises a legacy firmware module and a native firmware module written for native and legacy instruction set architectures (ISAs), respectively. A data structure is associated with the legacy firmware module to provide access to one or more legacy routines through a first dispatcher. The native firmware nodule includes a prologue routine. The prolog routine locates the data structure associated with the legacy firmware module and initializes it to provide a link between the first and second firmware modules.

23 Claims, 4 Drawing Sheets

METHOD OF COMMUNICATION BETWEEN FIRMWARE WRITTEN FOR DIFFERENT INSTRUCTION SET ARCHITECTURES

BACKGROUND OF THE INVENTION

1. Technical Field

The present invention relates to firmware and in particular to system and methods for communicating between firmware written for different instruction set architectures.

2. Background Art

Firmware refers to processor routines that are stored in non-volatile memory structures such as read only memories (ROMs), flash memories, and the like. These memory structures preserve the code stored in them, even when power is shut off. One of the principle uses of firmware is to provide the routines that control a computer system when it is powered up from a shut down state, before volatile memory structures have been tested and configured. The process by which a computer is brought to its operating state from a powered down or powered off state is referred to as bootstrapping. Firmware routines may also be used to reinitialize or reconfigure the computer system following various hardware events and to handle certain platform level events like system interrupts.

The bootstrapping process typically begins with the processor(s) in a computer system and proceeds outward to system level resources. Initially, each processor tests its internal components and interfaces. In multiprocessor systems, a single bootstrap processor (BSP) is usually selected to handle initialization procedures for the system as a whole. These procedures include checking the integrity of memory, identifying and initializlng other resources in the computer system, loading the operating system into memory, and initializing the remaining processors. Since volatile memory structures such as caches and random access memory (RAM) are not dependable until later in the boot process the processor implements some of its early firmware routines for the various bootstrapping procedures inside nonvolatile memory.

Firmware is typically written in assembly language. This is a low level computer language that provides direct access to processor hardware and, consequently, is closely tied to the processor architecture. The processor architecture is reflected in the rest of the platform, in part, because of the assembly level firmware that is used to initialize, configure, and service platform level resources. For example, platform resources may transfer data through specified registers and/ or memory locations defined by the Instruction Set Architecture (ISA), and platform level interrupts may be handled by referring to specified processor registers. Thus, initialization and configuiration of platform level resources are tied to the ISA of the underlying processor. These ties between assembly level firmware and the ISA also mean that the firmware can not be converted to different ISAs without extensive rewriting.

The ISA-specific nature of firmware is significant for processors that support more than one ISA. For example, the Merced™ processor is the first of a line of processors designed by Intel® Corporation of Santa Clara, Calif. to implement an Intel Architecture 64-bit ISA (IA-64). These IA-64 processors also include resources to execute programs coded in an Intel Architecture 32-hit ISA (IA-32). While the Merced™ processor and its progeny support IA-32 instructions, they are not IA-32 processors. Among other things, their register structures, memory addressing schemes and buses reflect their native IA-64 architecture rather than the legacy IA-32 architecture.

The IA-64 platform is new, and consequently, there are relatively few resources designed specifically for the IA-64 platform. On the other hand, there is a wealth of resources available for- IA-32 platforms, including mass storage media controllers, keyboards, mice, monitors, peripheral devices, and the IA-32 firmware that supports them. Huge investments have also been made in IA-32 firmware for newer technologies such as Advanced Configuration And Power Management Interface (ACPI), Wired For Management (WFM). In addition, compression technology is available to significantly reduce the space required to store IA-32 firmware. Approximately 1 Megabyte ("Mbyte") of firmware code may be compressed to approximately 512 Kilobytes (Kbytes), using this IA-32 firmware. Supporting these legacy resources and firmware technologies on the IA-64 platform would allow developers to preserve the investments they have already made in the IA-32 platform and reduce the time to market of IA-64 systems.

Supporting legacy firmware (IA-32) on a new processor architecture (IA-64) is a relatively complex undertaking. For example, in addition to the obvious differences in register sizes, and addressable memory, there are multiple addressing modes in the IA-32 ISA that are not present in the IA-64 ISA. IA-32 employs a mode called protected mode to increase the addressable memory size from 1 megabyte to 4 gigabytes. The present invention addresses these and other issues associated with the support of legacy firmware in a different native environment.

SUMMARY OF THE INVENTION

The present invention provides a system and method that support communications between firmware modules based on different ISAs.

In accordance with the present invention, a system comprises a first firmware module and a second firmware module written for legacy and native ISAs, respectively. A data structure is associated with the first firmware module to provide access to one or more legacy routines through a first dispatcher. The second firmware module includes a prologue routine. The prolog routine locates the data structure associated with the first firmware module and initializes it to provide a link between the first and second firmware modules.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention.

However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
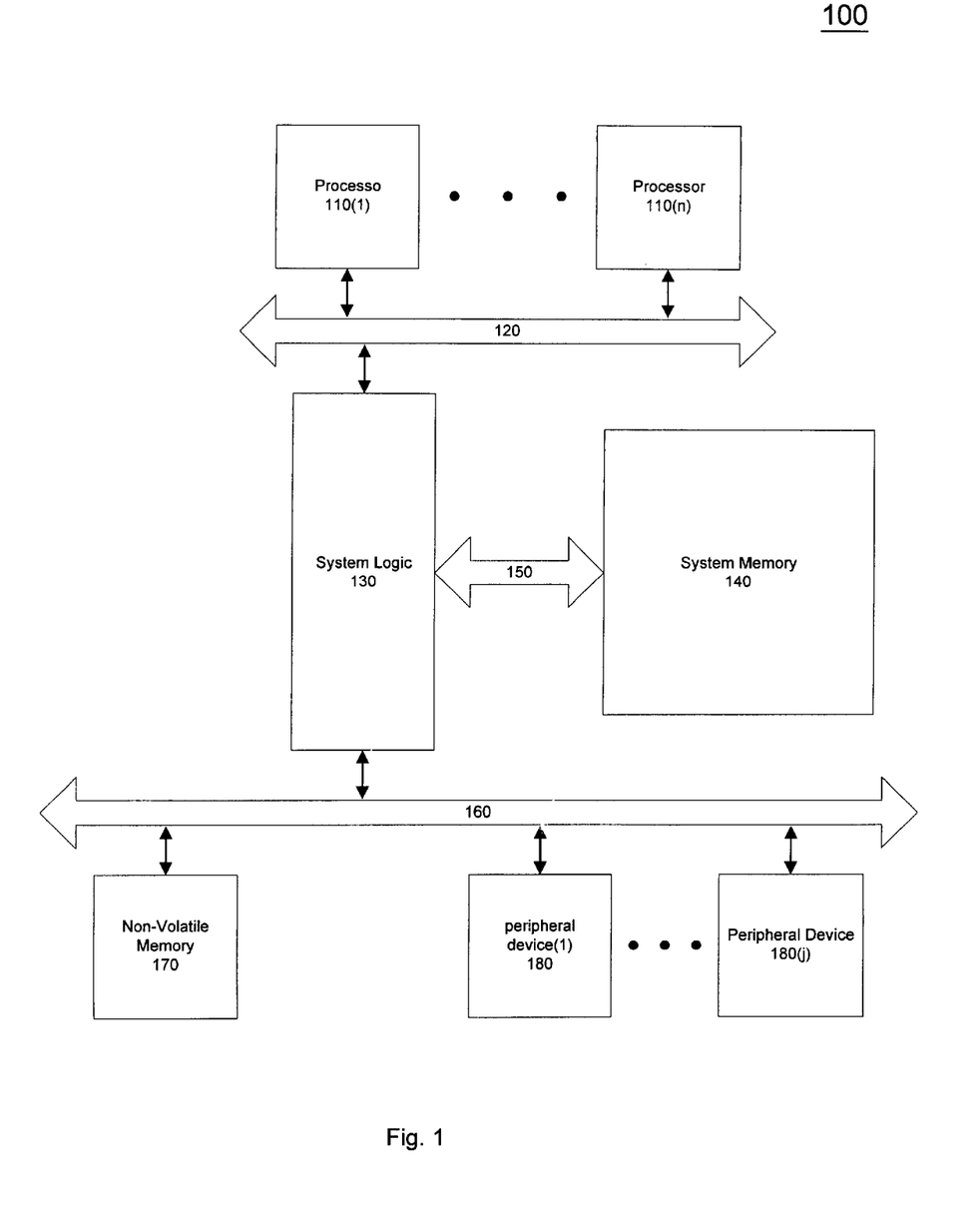
FIG. 1 is a block diagram of a computer system that includes a firmware system in accordance with the present invention.

FIG. 1 is a block diagram of one embodiment of a computer system 100 that is suitable for implementing the present invention. The disclosed embodiment of computer system 100 includes one or more processors 110(1)–110(n) (collectively, processors 110) that are coupled to system logic 130 through a processor bus 120. A system memory 140 is coupled to system logic 120 through bus 150. A non-volatile memory 170 and one or more peripheral devices 180(1)–180(j) (collectively, devices 180) are coupled to system logic 130 through peripheral bus 160. Peripheral bus 160 represents, for example, one or more peripheral component interconnect (PCI) buses. industry standard architecture (ISA) buses, extended ISA (EISA) buses, and comparable peripheral buses. Non-volatile memory 170 may be a static memory device such as a read only memory (ROM) or flash memory. Peripheral devices 180 include, for example, a keyboard, mouse or other pointing devices, mass storage devices such as hard drives and digital video discs (DVD), a display, and the like. These devices, together with system logic 130 define the computing platform-iii for system 100.

For the disclosed embodiment of system 100, processors 110 may implement a first instruction set architecture (ISA), e.g., IA-32 and a a second ISA, e.g., IA-64. As noted above, IA-32 has enjoyed widespread use and there is a significant infrastructure in place to support IA32-based platforms. This infrastructure includes a large number of peripheral devices 180 and the basic input output systems (BIOS or firmware) necessary to boot, configure, and support these devices. On the other hand, IA-64 is a relatively new platform and has correspondingly less infrastructure support.

The present invention provides a means to support legacy resources, e.g. resources developed for the IA-32 platform, on a different platform, e.g. IA-64. For one embodiment, non-volatile memory 170 stores a hybrid firmware system that includes first and second modules for legacy and native platforms, respectively. A mechanism is provided to allow communications between the first and second modules.

Figure 2:
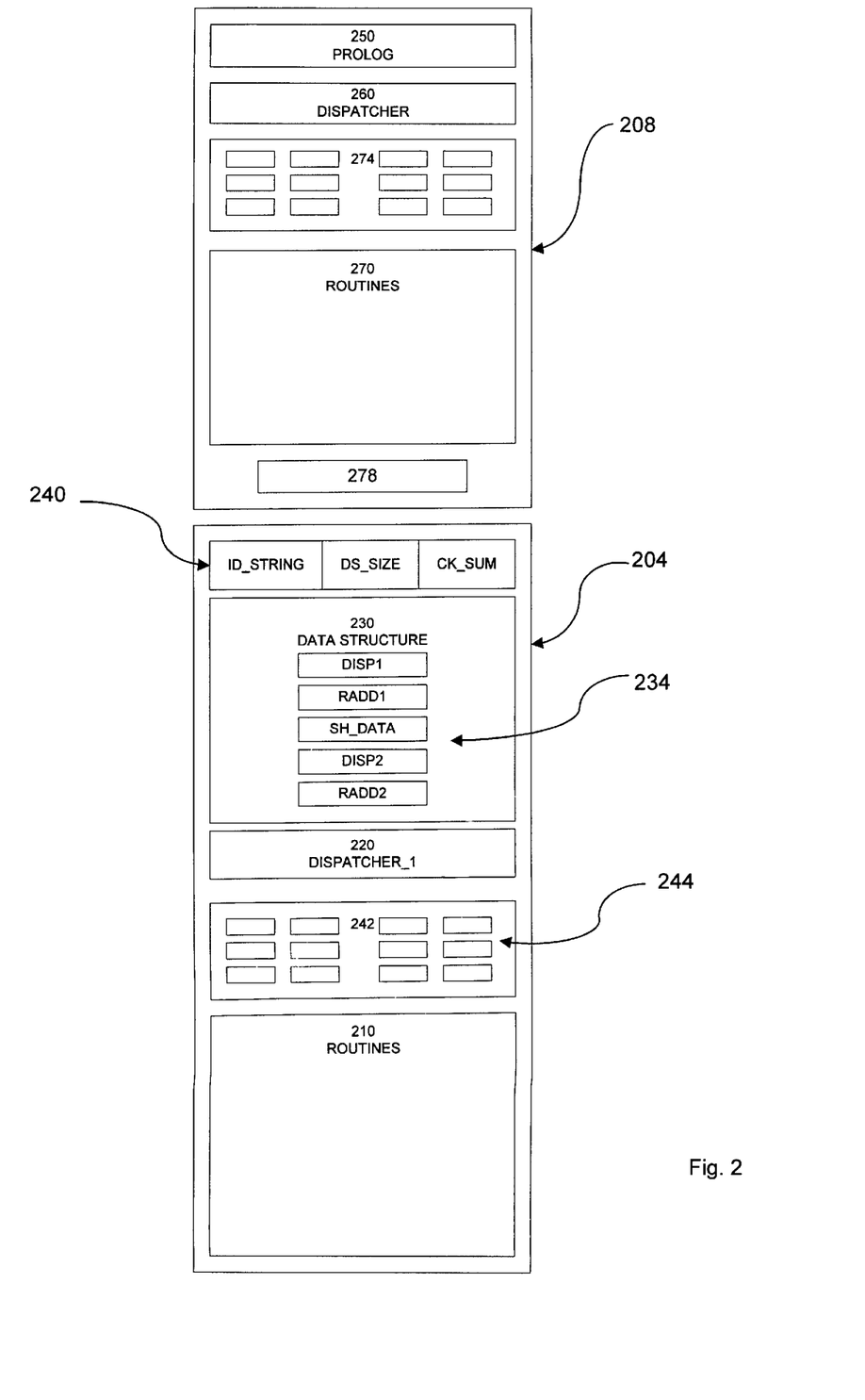
FIG. 2 is a block diagram of a firmware system stored in the non-volatile memory of FIG. 1.

FIG. 2 is an expanded block diagram of a firmware system 200, including a first firmware module (FW1) 2(04 and a second firmiiwar-e module (FW2) 208. The disclosed embodiment of FW1 204 includes one or more routines 210, a dispatcher 220, and a data structure 230. Data structure 230 is tagged by an identifier block 240 that allows it to be identified and validated by FW2 208.

Routines 210 provide firmware level support for resources associated with the legacy platform. For example, routines 210 may include IA-32 code sequences that initialize and configure keyboards, input devices, video displays or similar devices that have been developed for IA-32 platforms. Routines 210 may also include procedures for handling platform level interrupts and procedures to implement newer computer technologies like ACPI, WFM.

For one embodiment of firmware system 200, a call table 242 associated with FW1 204 may be used to store pointers 244 to different routines 210. Each pointer 244 is assigned an index through which the pointer (and its associated routine 210) may be accessed. For example, dispatcher 220 may receive an indexed input from FW2 208 and use the included index to access one of routines 210 via call table 242.

Data structure 230 includes multiple storage locations 234, which may be used to point to different components of firmware system 200. This information allows routines from one firmware module to access routines in another firmware module. For the disclosed embodiment, locations 234 are provided to store pointers to dispatcher 220 (DISP1), a return address (RADD1) in FW1 204, a shared memory location 278(SH_DATA) , a dispatcher 260 (DISP2) in FW2, and a return address (RADD2) in FW2 208. The value of DISP2, SH_DATA, and an initial value of RADD2 may be provided by FW2 208 when it first accesses data structure 230. For the disclosed embodiment, shared memory location 278 is associated with FW2 208, but it may be defined by either FW1 204 or FW2 208.

DISP1 may be set when data structure 230 is compiled and built in FW1 204, since the relative location of dispatcher 220 is available at build time. RADD1 is set when a routine 210 in FW1 204 accesses a routine in FW2 208. RADD1 points to a location in firmware module 204 to which control is returned following execution of the routine in FW2 208. Similarly, RADD2 is set when a routine in FW2 208 accesses a routine in FW1 204. RADD2 points to a location in FW2 208 to which control is returned following execution of the routine in FW1 204. SH_DATA is a pointer to a shared memory location defined in block 278. The value of SH_DATA may be set when data structure 230 is copied to system memory 140, and memory is allocated for SH_DATA. The shared memory location is used to store the input arguments and output parameters when a particular procedure in one firmware block calls another procedure in the other firmware block.

Identifier block 240 is associated with data structure 230 and includes information that allows FW2 208 to locate and validate data structure 230. One embodiment of identifier block 240 includes an identification string ($ID_{13}$ STRING), a size parameter (DS_SIZE), and a checksum value (CHK_SUM). ID_STRING is a string of characters for which FW1 204 may be scanned. DS_SIZE indicates the size of data structure 230 and CHK_SUM is a value derived from data structure 230. FW2 208 may process the data of size DS_SIZE following identifier block 240 to determine a value. Comparing the value with CHK_SUM indicates whether any errors have been generated during transmission or storage of data structure 230.

FW2 208 includes prolog routine 250, dispatcher 260, and routines 270. The disclosed embodiment of FW2 208 also defines a shared memory location 278. Routines 270 provide firmware support for platform infrastructure associated with the second ISA. For example, routines 270 may include IA-64 code sequences that initialize and configure processor (s) 110, system logic 130, system memory 140, and other resources that operate in the native IA-64 environment. Dispatcher 260 provides access to routines 270. One embodiment of FW2 208 employs a call table 274 for dispatcher 260 similar to that employed by FW1 204.

For the disclosed embodiment of the invention, prolog routine 250 coordinates initialization and configuration procedures for system 100 when a boot or reset condition is triggered. For example, following certain processor level initialization and checking procedures, prolog routine 250 may establish a communication link with FW1 204. This may be accomplished by scanning FW1 204 for identifier block 240 and processing it to locate and validate data structure 230. The location of data structure 230 is stored for future reference, and one or more entries (DISP2, SH_DATA) in data structure 230 are initialized for subsequent communications.

For one embodiment of the invention, FW2 208 includes system level software, e.g. a system abstraction layer (SAL), which abstracts features of computer system 100 to ensure that a uniform set of system level features is available. FW2 208 may also include a processor abstraction layer (PAL,) that interacts primarily with the processor core of the IA-64 platform. In this embodiment, FW2 208 accesses legacy firmware (e.g. IA-32 BIOS) via FW1 204 to initialize. test, and configure legacy platform infratstructure. FW2 208, e.g. the SAL, emulates the IA-32 execution environment in which the legacy firmware like IA-32 BIOS operates.

For one embodiment of the invention, FW2 208 scans legacy FW1 204 in non-volatile memory 170 and copies parts of it to system memory 140 during boot operations. Loading legacy FW1 204 into system memory 140 allows FW2 208 to initialize selected entries in data structure 230 and crette all environment in which legacy routines 210 may operate. Running routines 210 from system memory 140 is also faster than running them from non-volatile memory 170.

The foregoing discussion refers to actions, procedures, etc implemented by FW1 204 and FW2 208. Persons skilled in the art will recognize that it is actually processors 110, e.g. the BSP, that perform these functions by implementing instructions in the firmware modules.

Figure 3:
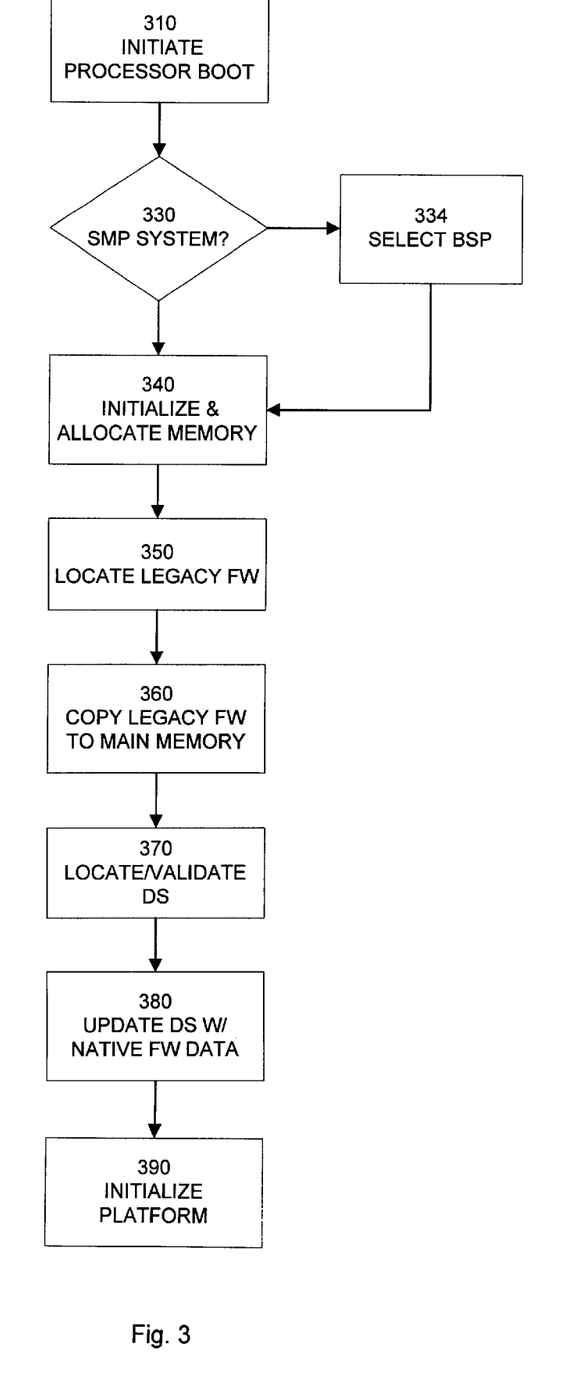
FIG. 3 is a flowchart representing a method for booting resources designed for a platform that implements a first instruction set architecture on a platform designed for a second instruction set architecture.

FIG. 3 is a flow chart representing a method 300 for booting system 100 in accordance with the present invention. When a reset condition is detected, the native firmware module, e.g. FWM2, initiates 310 a boot sequence in processor(s) 110. This may include, for example, a built in self test (BIST) and processor identity (ID) check. For one embodiment of the invention, these boot steps are implemented by a PAL firmware component, which hands control over to a SAL firmware component when the initial steps ale complete.

The native firmware module also determines 330 whether the computer system is a symmetric multi-processor system (SMP). If it is, a bootstrap processor (BSP) is selected 334 to continue with the boot process. If it is not, the single processor is the BSP. In either case, the BSP implements the native firmware module to initialize and allocate memory 340 for portions of the native and/or legacy firmware modules. The legacy firmware and its associated data structure are located 350 in the non-volatile memory 170. For example, the legacy firmware module may be located through a firmware Interface Table (FIT), which lists addresses and sizes for firmware components in the non-volatile memory. The data structure may be located by scanning the legacy firmware module for an identifier block associated with the data structure.

For one embodiment of method 300, an initialization routine in the native firmware module, e.g. prolog routine 250, copies 360 the legacy firmware module to the system memory, and locates and validates 370 the associated data structure. The data structure may then be updated 380 with one or more pointers to resources in the native firmware module. The order of events indicated in FIG. 3 is not essential to the present invention. For example, the data structure may be located in the legacy firmware module and validated before it is copied it to main memory. In this case, the location of the data structure is updated when it is copied to the main memory, The native firmware module may use pointer information in the data structure to call routines in the legacy firmware module to initialize 390 legacy platform resources. These legacy routines may also refer to routines in the native firmware module (via dispatcher 260) to complete various initialization steps that are clone using FW2 (208). Exemplary legacy routines that may be invoked in the boot process include routines to set up an interrupt table for the IA-32 platform resources as well as various routines to initialize these resources. IA-32 platform resources to be initialized may include a direct memory access (DMA) controller, keyboard, mouse, video display, and PCI card. Legacy firmware routines may also implement specifications like ACPI, WFM, and System Management BIOS 2.0 (SMBIOS).

In order to implement these and other IA-32 routines correctly, the native, e.g. IA-64, platform virtualizes the legacy environment, e.g. IA-32. In the example above, the virtual environment accommodates the mode switching behavior of IA-32 routines and other features of the architecture and memory model for which these routines were written. For example, in the IA-32 memory model, the IA-32 BIOS is copied to an entry point in the system memory that is 16 bytes below 4GB, and the body of the IA-32 firmware is copied to the system memory beginning at 1MB. As described below, the virtual environment replicates the entry point and address range of the IA-32 BIOS within the IA-64 environment. It also handles the full memory range addressed by the IA-32 BIOS in a single mode (Big Real Mode or BRM) with only a minor modification of the legacy code.

For one embodiment of the present invention, an entry point for the native firmware is located below 4GB in the system memory. The entry point provides access to the native firmware module, which copies the legacy firmware (lA-32 BIOS) to a memory location between 1MB and 1MB–128 KB. This may be done when the system is bootstrapped and the firmware is shadowed to the system memory. Thereafter, when an interrupt or a hardware event generated by a legacy resource occurs, control is transferred to the native firmware. The native firmware then uses the legacy firmware dispatcher (pointed to by the data structure) to access the appropriate legacy routine.

Mode switching behavior in the legacy routines may be handled by removing the mode switching function from the legacy firmware. In the legacy environment, the mode switching function must precede calls to memory addresses above 1MB, which can only proceed in protected mode. This function switches the processor in and out of the protected mode. Deleting these functions from the legacy firmware eliminates the mode switching behavior, but leaves the subsequent call to access data in the protected mode address. Since the native firmware sets up BRM before invoking any legacy firmware routine, addresses above 1MB are accessed properly without mode switching.

Figure 4:
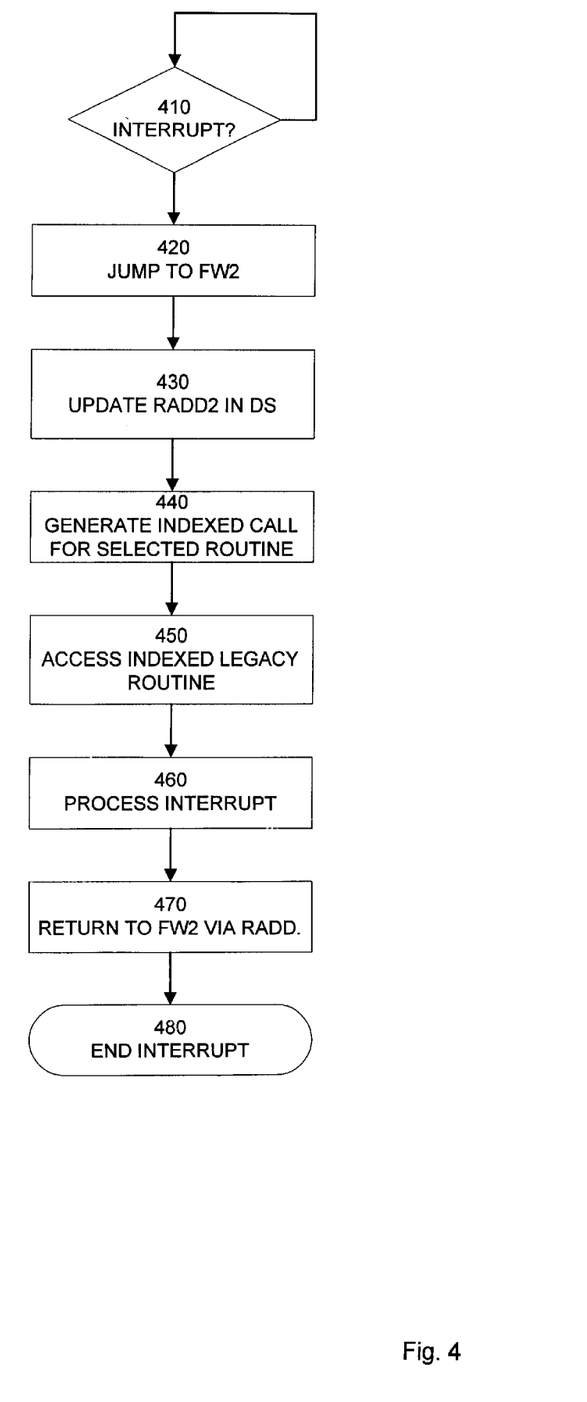
FIG. 4 is a flowchart representing a method for communicating between first and second software modules written for first and second instruction set architectures.

FIG. 4 is a flowchart representing one embodiment of a method 400 for using a data structure e.g. data structure 230, as a communication link between the native and legacy firmware modules. It is assumed that the firmware modules (or parts thereof) have been copied to system memory and the data structure has been initialized to indicate the locations of their dispatchers, ea. dispatchers 260 and 220 in the native and legacy firmware module, respectively.

Method 400 is initiated when an interrupt is detected 410 and processor control jumps 420 to the native firmware module (FW2). This happens automatically under the disclosed processor architecture, which takes control into native mode upon occurrence of an interrupt event. FW2 updates 430 the data structure with a return address so that control can be returned to the appropriate location in FW2 when the interrupt handler completes. FW2 also generates 440 an indexed call, using the legacy dispatcher address specified in the data structure and an index associated with the source of the interrupt. Interrupt hardware may identify the source of the interrupt. The legacy dispatcher address may be stored by FW2 or read on the fly from the data structure. In either case, the indexed call accesses 450 the lcgacy routine (interrupt handler) in FW1 that is identified by the index. For one embodiment, the legacy dispatcher uses a call table to identify the handler associated with the index.

The legacy routine processes 460 the interrupt in the virtualized legacy mode provided by the native mode. When interrupt processing completes, control is returned 470 to the native firmware, using the return address specified in the link data structure. The native firmware may reflect any status changes to the native mode interrupt resources when the interrupt completes 480.

The mechanism described above may also be used when an operating system loader program requests the firmware to make a legacy firmware call, and when a hardware interrupt occurs. A variation of this mechanism, which is described below, may also be used to process selected hardware interrupts. For example, selected hardware interrupts may be handled through a legacy interrupt vector table. This table resides at architecturally specified address locations, eliminating the need to access it through the data structure described above. When a hardware interrupt Occurs, processor control reverts to native mode (IA-64), and the native firmware determines if the interrupt handler is legacy firmware code. If it is, the native firmware module reads the legacy interrupt vector table, using architected legacy address locations, to determine the address of the legacy interrupt routine. The native firmware sends the CPU directly to the legacy service routine after adjusting the return stack pointer to point to an IA-32 illegal instruction. The illegal instruction may be planted in the legacy firmware module by the native firmware module. After the legacy handler executes, the illegal instruction is encountered, generating a voluntary fault that returns control to native mode. This second method can not be used to access legacy firmware routines that are embedded in code. Locating these routines requires recourse to the data structure described above.

There has been provided a system and method that allow routines, written for a first instruction set architecture, to be implemented by routines, written for a second instruction set architecture. The routines are initially embodied in first and second firmware module. The first firmware module includes a data structure that specifies a pointer to a first dispatcher. The first dispatcher provides access to a first set of routines written for the first ISA. The second firmware module includes a prolog routine to locate the data structure in the first firmware routine, update the data structure with a second pointer, and copy portions of both modules to a dynamic memory structure. The second pointer provides access to a second set of routines written for the second ISA.

The invention has been described with reference to specific embodiments. Persons skilled in the art and having the benefit of this disclosure will recognize that these embodiments may be modified in a variety of ways without deviating from the spirit of the invention. For example, while the disclosed embodiments refer to IA-32 and IA-64 ISAs, the invention is applicable to other ISAs. Similarly, the invention has been described for firmware that supports legacy platform resources. However, it may be beneficially applied to code provided for other purposes on other media, where translation between the different ISAs would be costly. The specific examples are provided only to more clearly illustrate various features of the invention, which is limited solely by the scope of the appended claims.

I claim:

1. A system comprising:
   a first firmware module including one or more routines written for a first instruction set architecture (ISA), the routines being accessible through a first dispatcher;
   a data structure associated with the first firmware module, the data structure including a first entry to store a pointer to the first dispatcher; and
   a second firmware module including a prolog routine written for a second ISA to locate the data structure and access the routines in the first firmware module using the first dispatcher.

2. The system of claim 1, wherein the data structure includes signature code to identify the data structure to the second firmware module.

3. The system of claim 1, wherein the data structure includes a second entry to store a pointer to a dispatcher associated with the second firmware module.

4. The system of claim 3, wherein the second firmware module includes one or more routines in the second ISA, the one or more routines being accessible through the associated dispatcher.

5. The system of claim 1, wherein the second firmware module includes one or more routines in the second ISA and a shared memory region is defined in the second firmware module to accommodate data from the one or, more routines in the first and second instruction sets.

6. The system of claim 1, wherein the prolog code of the second firmware module copies portions of the first firmware Module to a location in at random access memory, stores a location associated with the data structure, and updates the second entry of the data structure with a dispatcher address for the second firmware module.

7. A processor system comprising:
   a processor;
   a system memory; and
   a non-volatile memory in which is stored:
      a first firmware module including a data structure and routines in a first instruction set architecture (ISA) accessible through the data structure, the routines to provide access to legacy resources in the system; and
      a second firmware module including a prolog routine to identify the data structure in the first firmware module and access the first set of routines.

8. The system of claim 7, wherein the second firmware module further includes routines in a second ISA to access native resources in the system.

9. The system of claim 8, wherein the prolog routine copies portions of the first firmware module into the system memory and updates the data structure to provide the first firmware imodule with access to the routines in the second ISA.

10. The system of claim 7, wherein the second firmware module includes a boot routine that generates an operating environment for the first firmware module when the system is booted.

11. The system of claim 10, wherein the first ISA includes first and second operating modes and wherein an operating environment generated by the second firmware module virtualizes the first and second operating modes of the first ISA.

12. A method for communicating between first and second firmware routines written in first and second instruction sets, respectively, the method comprising:

associating a data structure with the first firmware routine, the data structure including an entry through which routines in the first firmware module may be accessed;

assigning a signature code to identify the data structure; and providing the second firmware routine with a prolog function to locate the data structure and to update the data structure with pointer information for the second firmware module.

13. The method of claim 12, wherein the pointer information provides the first firmware module with access to the routines in the second firmware module.

14. The method of claim 12, further comprising using the prolog function to copy portions of the first and second firmware modules to a dynamic memory structure .

15. A method for implementing legacy routines, written for a first instruction set architecture (ISA), on a platform implementing a second ISA, the method comprising:

locating a data structure associated with the legacy routines;

storing a return address to a routine written for the second ISA in the data structure; and calling a selected legacy routine through a dispatcher identified by the data structure.

16. The method of claim 15, wherein locating a data structure comprises:

initializing a boot routine written for the second ISA;

scanning a boot routine written for the first ISA for the data structure, the boot routine including the legacy routines; and recording a location for the data structure.

17. The method of claim 15, wherein calling a selected legacy routine comprises generating an indexed call to the identified dispatcher, the indexed call including an index for identifying a pointer to the selected routine.

18. The method of claim 15, further comprising returning control to the routine written for the second ISA, using the stored return address, when the selected legacy routine completes.

19. The method of claim 15, further comprising executing the selected legacy routine.

20. The method of claim 19, wherein executing the selected legacy routine includes:

storing a return address associated with the selected legacy routine in the data structure;

accessing a native routine through a second dispatcher specified in the data structure by the native boot routine; and returning to the selected legacy routine, via the stored return address, when the native routine completes.

21. A machine readable medium on which are stored instructions in a native ISA, executable by a processor to implement a method comprising:

scanning a code block written in a legacy ISA to locate a data structure;

determining a dispatcher location specified in the data structure, the dispatcher location to provide access to a plurality of legacy routines; and writing a return address to the data structure, the return address pointing to a location in the block of instructions in the native ISA; and accessing a selected one of the plurality of legacy routines through the dispatcher.

22. The machine readable medium of claim 21, wherein scanning a code block comprises:

locating the code block using a firmware identification table; and scanning the located code block for a locator block associated with the data structure.

23. The machine readable medium of claim 22, wherein scanning the located code block comprises:

A copying a portion of the located code block to a system memory; and scanning the copied portion for the locator block.

* * * * *

UNITED STATES PATENT AND TRADEMARK OFFICE
CERTIFICATE OF CORRECTION

PATENT NO. : 6,081,890            Page 1 of 1
DATED : June 27, 2000
INVENTOR(S) : Datta It is certified that error appears in the above-identified patent and that said Letters Patent is hereby corrected as shown below:

Column 3,
Line 26, delete "platform-iii" and insert -- platform --.

Column 5,
Line 17, delete "crette all" and insert -- create an --.
Line 35, delete "ale" and insert -- are --.

Column 6,
Line 1, delete "clone" and insert -- done --.

Column 7,
Line 7, delete "lcgacy" and insert -- legacy --.

Signed and Sealed this

Sixth Day of November, 2001

Attest:

*Nicholas P. Godici*

NICHOLAS P. GODICI
*Attesting Officer*      *Acting Director of the United States Patent and Trademark Office*